United States Patent [19]

Bandy, Jr.

[11] Patent Number: 5,074,827

[45] Date of Patent: Dec. 24, 1991

[54] REVERSIBLE CHAIN CONVEYOR SPROCKET ASSEMBLY

[75] Inventor: Clarence L. Bandy, Jr., Abingdon, Va.

[73] Assignee: American Longwall Mining Corporation, Abingdon, Va.

[21] Appl. No.: 573,733

[22] Filed: Aug. 28, 1990

[51] Int. Cl.⁵ .............................................. F16H 7/06
[52] U.S. Cl. .................................... 474/157; 474/164
[58] Field of Search ............. 474/152, 155, 156, 157, 474/158, 164, 8, 165

[56] References Cited

U.S. PATENT DOCUMENTS

| | | | |
|---|---|---|---|
| 1,921,329 | 8/1933 | Smoot | 474/162 |
| 2,799,174 | 7/1957 | Pelletier | 474/158 |
| 3,082,637 | 3/1963 | Paxton | 474/162 |
| 3,266,331 | 8/1966 | Burrows | 474/164 |
| 3,273,703 | 10/1965 | Fitzgerald | 474/158 |
| 3,685,367 | 8/1972 | Dawson | 474/164 |
| 3,805,631 | 4/1974 | Kerklies | 474/165 |
| 4,037,713 | 7/1977 | Soliman et al. | 474/165 |
| 4,043,214 | 8/1977 | Westlake | 474/162 |
| 4,049,112 | 9/1977 | Tyslauk | 198/834 |
| 4,308,019 | 12/1981 | Horkey | 474/162 |

Primary Examiner—Ramon S. Britts
Assistant Examiner—Roger J. Schoeppel
Attorney, Agent, or Firm—King & Schickli

[57] ABSTRACT

A reversible sprocket assembly for a chain and sprocket drive system includes a sprocket body having an inner hub portion with a central bore and an outer sprocket drive unit including teeth for engaging a drive chain. A coupling, such as mating splines, is provided along the bore for coupling the sprocket in driving relationship with the drive shaft. The coupling is reversible so that the bore of the hub may be received on the shaft with either end first. A counterbore is provided at each end of the hub adjacent the coupling so as to form end portions of the bore. When mounted on the shaft, one counterbore mates with a first shoulder on the shaft. A removable annular spacer forms a second shoulder to mate with the other counterbore. In this way, the sprocket body is securely supported in driving relationship on the shaft. By reversing the sprocket drive unit as a whole, the trailing faces of the teeth become the new drive faces and the life of the sprocket assembly is essentially doubled.

4 Claims, 2 Drawing Sheets

REVERSIBLE CHAIN CONVEYOR SPROCKET ASSEMBLY

TECHNICAL FIELD

The present invention relates generally to the haulage of aggregate material and, more particularly, to a reversible sprocket assembly for a scraper-chain conveying system providing reliable/dependable performance and an extended overall service life.

BACKGROUND OF THE INVENTION

Sprocket and chain gearing are commonly employed for power transmission in heavy equipment and machinery, such as armored face conveyors incorporating chain/flight conveying systems for coal or the like. Such conveyors typically run in one direction substantially all the time conveying the coal from a coal face to a delivery station. There the coal is transferred to the tailpiece of a takaway conveyor or other coal transporting equipment.

It should be appreciated that armored face conveyors operate in a harsh environment while conveying heavy loads of the coal or other won aggregate material. Since these conveyors are operated in substantially one direction all the time, the load bearing or driving faces of the sprocket teeth that drive the chains are subjected to a high degree of wear. Once worn, the drive sprocket must be replaced to ensure proper conveyor operation.

It should be recognized, however, that the reverse side or trailing faces of the sprocket teeth are subjected to little force and little or no wear. Accordingly, these surfaces are essentially like new when the drive faces are worn out and the sprocket is replaced. Prior art sprocket designs for armored face conveyors have, however, failed to take this into consideration. In fact, the sprockets have been constructed with an integral shoulder at one end of the central bore that effectively prevents reversibility.

The present invention recognizes the untapped resource represented by the trailing faces of the teeth and takes advantage of it to essentially double the service life of a drive sprocket. More particularly, the drive sprocket assembly of the present invention is designed to be reversible. Accordingly, when the original driving faces of the sprocket teeth become worn, the sprocket is first disassembled from the conveyor drive shaft. The orientation of the sprocket is then reversed and the sprocket is reassembled on the conveyor drive shaft. The previous, unworn trailing faces of the sprocket teeth thereby become the new drive faces for engaging and driving the chains. Thus, it should be appreciated that replacement of the sprocket is not necessary until both sides of the sprocket teeth become fully worn.

The desirability of providing reversible sprockets has been recognized in the art before. The proposed solutions, however, have not been fully acceptable. For example, in U.S. Pat. Nos. 1,921,329 to Smoot and 4,308,019 to Horkey et al., sprocket drive units are provided with reversible teeth to solve this problem. While this approach effectively increases the service life of the sprocket teeth, it suffers a number of drawbacks. First, it should be appreciated that the reversing of the individual teeth is a labor intensive and time consuming task. In fact, the high cost of labor and the associated down time of equipment resulting in lost production economically prohibit application of this procedure in commercial settings. Additionally, it should be appreciated that the individual teeth are prone to become loose when subjected to particularly high loads, such as commonly experienced during armored face conveyor operation. This problem is further exacerbated by the harsh operating environment in an underground mine. Accordingly, it should be appreciated that the concept of providing a sprocket with reversible teeth is not appropriate for many applications, including armored face conveyors.

U.S. Pat. Nos. 3,082,637 to Paxton, 4,043,214 to Westlake and 4,049,112 to Tyslauk all disclose sprocket assemblies including two-piece sprocket drive units which may be removed from cooperating hubs so as to allow ready replacement without removal of the hub from the driving shaft. None of these references specifically disclose or suggest the concept of reversing the orientation of the sprocket drive units. Further, it should be appreciated that the heavy loads and harsh environment, such as experienced by an armored face conveyor, would lead to the direct application of large forces and stress concentrations on the fasteners at the center joint holding the two-piece drive units together. The likely result is premature failure. Accordingly, it should be appreciated that a new approach is needed to provide a reversible sprocket for heavy duty applications, including armored face conveyors.

SUMMARY OF THE INVENTION

It is a primary object of the present invention to provide a reversible sprocket assembly for a chain and sprocket drive system overcoming the above-described limitations and disadvantages of the prior art.

Another object of the present invention is to provide a heavy duty reversible sprocket assembly that may be easily reversed with a minimum amount of equipment down time. Advantageously, reversibility is attained without utilizing any component fasteners as in prior art designs that are subjected to force and stress concentration during equipment operation.

Yet another object of the present invention is to provide a reversible sprocket assembly of relatively simple and inexpensive construction providing reliable and dependable performance over an extended service life.

A further object is to provide a reversible sprocket assembly that may be installed on a standard conveyor drive shaft without modification, thereby establishing a significant retrofit market.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved reversible sprocket assembly is provided for a chain and sprocket drive system. The assembly comprises a sprocket body including an outer sprocket drive unit and an inner hub portion with a central bore. A coupling mechanism is provided along the bore for coupling the hub of the sprocket body in driving relationship to a drive shaft. The coupling may, for example, take the form of internal splines in the bore that mate with external splines on the drive shaft. Of course, a key and mating keyway or other means of connection may be utilized.

In accordance with an important aspect of the present invention, the coupling mechanism utilized is reversible so that the bore of the hub may be received on the drive shaft with either end first. Accordingly, when the drive teeth become worn the sprocket body and the sprocket drive unit associated therewith may be reversed so that the trailing faces of the teeth not previously subjected to wear are now presented as driving faces. In this way, the service life of the sprocket assembly and more particularly the sprocket drive unit, is essentially doubled. Further, this end is achieved while relying on an established and dependable coupling mechanism to complete the connection between the assembly and a standard drive shaft.

More particularly describing further details of the invention, a counterbore is provided at each end of the hub adjacent the coupling mechanism. The counterbores form the end portions of the central bore. The reversible sprocket assembly of the present invention is designed, when properly mounted on a drive shaft, to have one counterbore mating with a first shoulder on the drive shaft. A removable annular spacer forms a second shoulder that mates with the other counterbore. This spacer includes an inner bore that is also snugly received on the drive shaft to provide full support to the sprocket body. Advantageously, the spacer may be simply pressed into position in the counterbore of the sprocket body.

When the teeth of the sprocket drive unit become worn, the sprocket assembly is removed from the drive shaft. The annular spacer is then disassembled from the counterbore at one end of the hub. The spacer is then pressed into the other counterbore at the opposite end of the hub and the sprocket assembly is reattached to the drive shaft. It should therefore be appreciated that the sprocket assembly is easy to reverse and the whole operation may be completed in a period of time essentially equivalent to that required to replace a prior art sprocket.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 3 is a cross-sectional view of the reversible sprocket assembly showing the annular spacer received in the counterbore at one end of the sprocket body; and FIG. 4 is an exploded view showing the annular spacer removed from the sprocket body.

Reference will now be made in detail to the present preferred embodiment of the invention, an example of which is illustrated in the accompanying drawing.

DETAILED DESCRIPTION OF THE INVENTION

Figure 1:
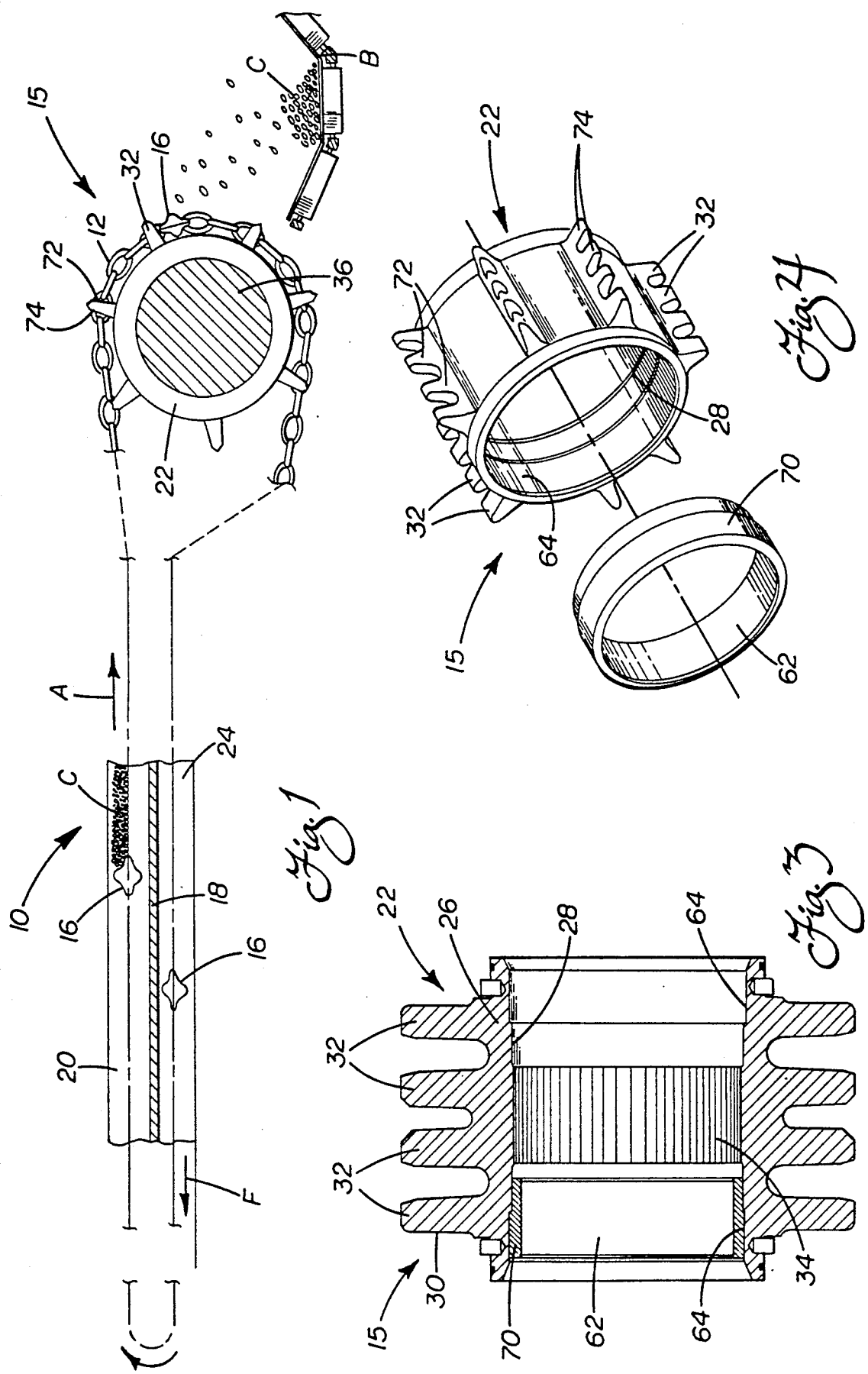
FIG. 1 is a schematic side elevational view with a portion broken away for clarity depicting an armored face conveyor and incorporating the reversible sprocket assembly of the present invention mounted on a drive shaft (in cross section)

Reference is now made to FIG. 1 schematically showing an armored face conveyor 10 including a guided endless drive chain 12 driven through the sprocket assembly 15 of the present invention. A companion drive chain that may be employed in side by side relationship is not shown. As is known in the art, flight bars 16 are mounted to individual links of the chain or chains 12 in spaced positions. During operation, these flight bars 16 push the aggregate material, such as coal C, along the conveyor floor pan 18 between parallel side walls 20 (only one shown in FIG. 1). The coal is conveyed by the flight bars 16 in the direction of the action arrows A to the forward end of the conveyor where it may, for example, be deposited over the drum (see reference numeral 60 in FIG. 2) onto a tailpiece unit of a takaway belt conveyor B for delivery to the surface. The flight bars 16 and chain 12 then return around the drive sprocket 22 to the receiving or input end of the conveyor in a return run 24 provided between the floor pan 18 of the conveyor 10 and the floor F of the mine.

Figure 2:
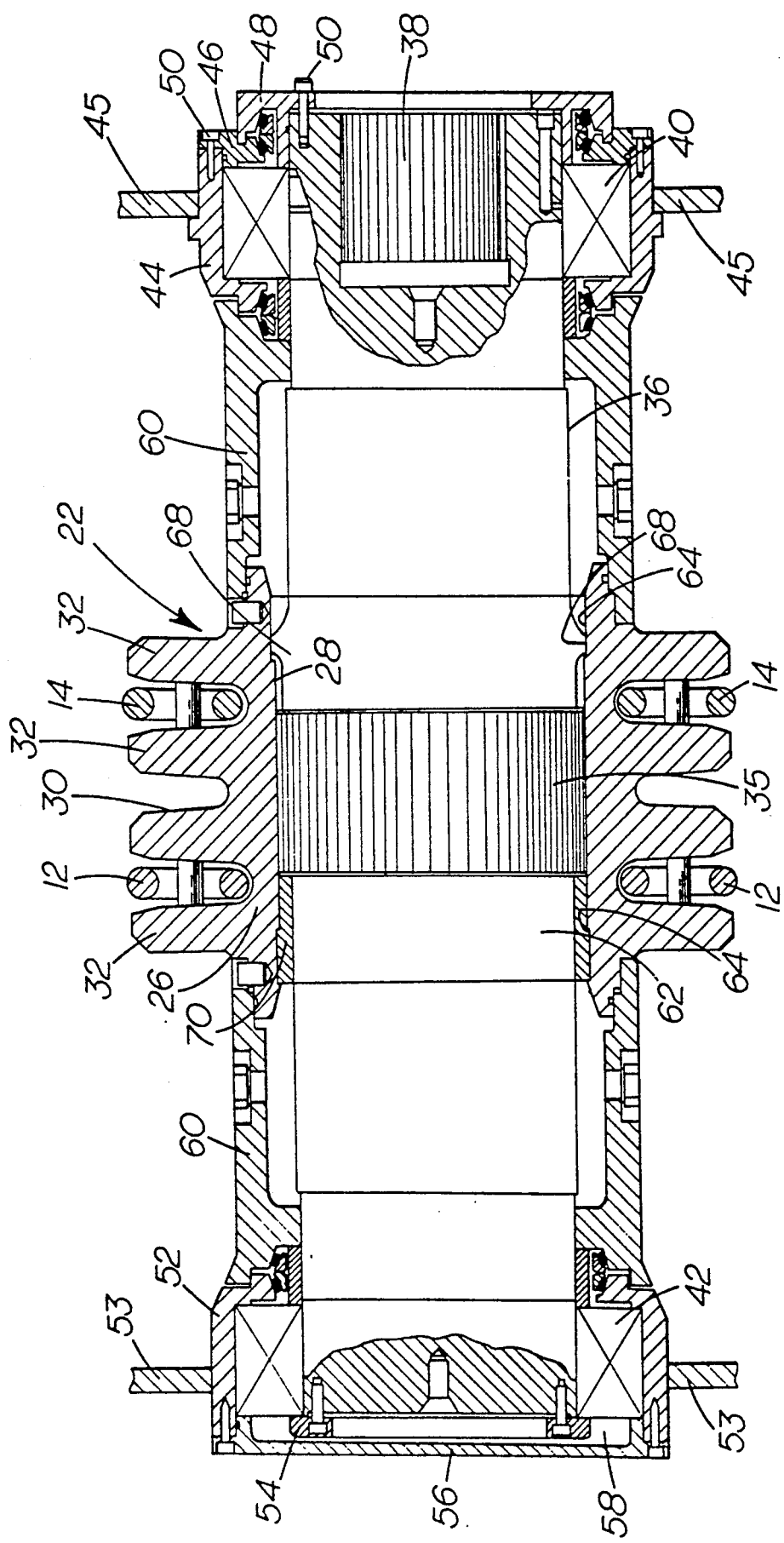
FIG. 2 is a longitudinal cross-sectional view showing the reversible sprocket assembly coupled to the drive shaft of the drive unit of the conveyor shown in FIG. 1.

As shown in FIGS. 2 and 3, the drive sprocket 22 includes an inner hub portion 26 with a central bore 28. The drive sprocket 22 also includes an outer sprocket drive unit 30 including spaced teeth 32 for embracing the vertical links and drivingly engaging the horizontal links of the drive chain 12. As further shown in FIG. 3, the drive sprocket 22 includes internal splines 34 in the bore 28 for coupling the sprocket to mating external splines 35 on a drive shaft 36 (see FIG. 2). Of course, it should be appreciated that other methods of coupling the sprocket body 26 to the drive shaft 36 may be utilized.

The drive shaft 36 is powered by a drivemotor (not shown) that advances the conveyor 10. More specifically, one end of the drive shaft 36 may include internal splines 38 for operatively coupling with external splines on an output shaft (not shown) of the drive motor.

As shown, the drive shaft 36 is rotatably received and supported at its proximal end in a bearing 40 and at its distal end in a bearing 42. As shown, the bearing 40 is received in a housing 44 that is mounted to a side wall 45 of the conveyor 10. A bearing cap 46 and retainer 48 are connected by means of screws or bolts 50 to the housing 44 and the drive shaft 38, respectively; O-ring seals being provided to allow the shaft/retainer to rotate, and at the same time the bearing to be sealed and remain lubricated.

As also shown, the bearing 42 at the distal end of the drive shaft 36 is received within a housing 52. This housing is also mounted to a conveyor sidewall 53 or the like. A retainer ring 54 fastened to the drive shaft 36 clamps the assembly together. A bearing cap 56 fastened to the housing 52 seals the end of the bearing 52 in a chamber 58 containing lubricant. As should also be appreciated, drums or barrels 60 are fastened to the drive sprocket 22 and are, accordingly, rotatably driven by the drive shaft 36. A chamber between the drums 60 and drive shaft 36 and O-ring seals at the ends allows lubricant to be retained along the length of the shaft.

In accordance with the present invention, the reversible sprocket assembly 15 (see FIGS. 3 and 4) includes the drive sprocket 22 and a cooperating removable annular spacer 62. As shown, each end of the central bore 28 of the drive sprocket 22 includes a counterbore 64. The counterbores 64 are adjacent the splines 34 that connect the bulb of the sprocket 22 to the drive shaft 36. The counterbores 64 are symmetrical and form end portions of the central bore 28.

As best shown in FIG. 2, when the sprocket assembly 15 is properly positioned on the drive shaft 36, one counterbore 64 mates with a first shoulder 68 on the drive shaft 36. Such a shoulder 68 is machined directly on the drive shafts now in use in the field, and previously adapted to receive the old irreversible sprocket design. Accordingly, it should be appreciated that the sprocket assembly 15 of the present invention advantageously retrofits armored face conveyors already in existence. As such, the concept of the invention is particularly beneficial to current equipment operators as no basic equipment conversion to the new design is necessary.

The removable annular spacer 62 forms a second shoulder 70 that mates with the other counterbore 64 (see FIG. 3). Together, the shoulders 68 and 70 securely support the sprocket assembly 15 at each end of the splines 34 and combined with driving relationship afforded by the mating splines 34, 35, the sprocket assembly is supported along substantially its full length on the shaft 36.

Due to the fact that armored face conveyors are almost exclusively driven in a single direction, after an extended period of time the driving faces 72 (see FIGS. 1 and 4) of the teeth 32 become worn. In order to prevent deleterious looseness in the driving relationship, and resultant jerky action in the conveyor, it eventually becomes necessary to provide new driving faces. Advantageously, by simply reversing as a whole the sprocket drive unit 30 and all the teeth 32 by simply turning the sprocket assembly 15, end for end, the former trailing faces 74 of the teeth 32 become the new driving faces. Since the conveyor 10 is operated substantially universally in a single direction, it should be appreciated that these trailing faces 74 are like new when the sprocket assembly 15 is reversed. Accordingly, a substantial increase in service life is provided by the reversible sprocket assembly 15 of the present invention.

In order to reverse the sprocket assembly 15, the bearing assembly at the distal end of the shaft 36 must be removed. As is known in the art, this may be accomplished by removing the bearing caps 56 and then simply pulling the bearing housing 52, the bearing 42 and the drum section 60 and sliding it off the end of the shaft. In addition, the chain 12 is released from the sprocket teeth 32.

Following sliding the reversible sprocket assembly 15 from the end of the shaft 36, the annular spacer 62 is withdrawn from the counterbore 64 (at the left end of the sprocket 22, as shown in FIGS. 3 and 4). The annular spacer 62 is then repositioned in the counterbore 64 in the opposite end (at the right end) of the sprocket 22.

The sprocket assembly 15 is then reversed with the left end going on first, and the right end with the spacer 62 going on last. To explain the reassembly process another way, the counterbore 64 originally receiving the spacer ring 62, mates with the shoulder 68 on the drive shaft 36. All that is required is simply sliding the sprocket assembly 15 axially along the shaft 36 to the right until the internal splines 34 on the sprocket 22 engage the external splines 35 on the drive shaft. Next, the assembly of the bearing housing 52, the bearing 42 and the drum section 60 is repositioned on the drive shaft 36. The chain 12 is repositioned in the teeth 32 of the sprocket assembly 15. Further, any necessary lubricant is added. The conveyor 10 is then again ready for operation. What were previously the trailing faces 74 of the teeth 32 are now positioned for driving the chain 12. Accordingly, it should be appreciated that as a result of this reversal procedure the service life of the sprocket 22 is effectively doubled while a minimum amount of down time is required to complete the reversal procedure.

In summary, numerous benefits are achieved utilizing the reversible sprocket assembly 15 of the present invention. It provides reliable and dependable performance utilizing the same coupling to the drive shaft 36 in either of its operative positions. The assembly 15 is easy to reverse with a process that is able to be completed with a minimum amount of down time. Accordingly, the maintaining of high productivity levels is possible. Additionally, the reversible sprocket assembly 15 with the sprocket drive unit being reversed as a whole to provide new drive faces on all the teeth effectively provides an extended service life, i.e. a life substantially twice as long when compared with prior art sprockets not designed to allow reversal.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

I claim:

1. A reversible sprocket assembly for a chain and sprocket drive system adapted for coupling to a drive shaft, comprising:
   a sprocket body including an inner hub portion with a central bore;
   an outer sprocket driven unit on said body including sprocket teeth; and
   means along said bore for coupling said hub in driving relationship to said drive shaft;
   said coupling means being reversible so that the bore of said hub is received on said shaft with either end first;
   said coupling means allowing bi-directional driving rotation of said sprocket assembly;
   whereby the sprocket body may be reversed to allow reversal of said sprocket drive unit as a whole when the teeth are worn and present new driving faces of the teeth while allowing bidirectional driving of said drive system.

2. The reversible sprocket assembly of claim 1 wherein said coupling means includes internal splines in said bore for mating with external splines on said shaft.

3. The reversible sprocket assembly of claim 2, wherein is provided a counter bore at each end of said hub adjacent said coupling means and forming end portions of said bore, one counterbore mating with a first shoulder on said shaft, and a removable annular spacer forming a second shoulder to mate with the other counterbore;

whereby said sprocket body is securely supported and in driving relationship on said shaft along substantially the full length of said bore.

4. A reversible sprocket assembly for a chain and sprocket drive system adapted for coupling to a drive shaft, comprising:

a sprocket body including an inner hub portion with a central bore;

an outer sprocket drive unit on said body including sprocket teeth;

means along said bore for coupling said hub in driving relationship to said drive shaft;

said coupling means being reversible so that the bore of said hub is received on said shaft with either end first;

a counterbore at each end of said hub adjacent said coupling means and forming end portions of said bore;

one counterbore mating with a first shoulder on said shaft; and a removable annular spacer forming a second shoulder to mate with the other counterbore;

whereby the sprocket body may be reversed to allow reversal of said sprocket drive unit as a whole when the teeth are worn and present new driving faces of the teeth, and said sprocket body is securely supported and in driving relationship on said shaft along substantially the full length of said bore.

* * * * *